United States Patent [19]

Harmon

[11] Patent Number: 5,485,338
[45] Date of Patent: Jan. 16, 1996

[54] PAPERBOARD MICRO COMPUTER DISKETTE

[75] Inventor: Thomas D. Harmon, Woburn, Mass.

[73] Assignee: International Paper Company, Purchase, N.Y.

[21] Appl. No.: 436,680

[22] Filed: May 8, 1995

Related U.S. Application Data

[63] Continuation-in-part of Ser. No. 239,000, May 6, 1994.

[51] Int. Cl.⁶ .................................................. G11B 23/033
[52] U.S. Cl. ............................................ 360/133; 360/132
[58] Field of Search .......................... 360/133, 131–132, 360/135

[56] References Cited

U.S. PATENT DOCUMENTS

| | | | |
|---|---|---|---|
| 3,422,952 | 1/1969 | George | 206/62 |
| 3,987,900 | 10/1976 | Tadokoro et al. | 206/313 |
| 4,232,592 | 11/1980 | Gingerich | 493/266 X |
| 4,277,810 | 7/1981 | Helmrich | 360/133 |
| 4,304,621 | 12/1981 | Appoldt et al. | 156/443 |
| 4,310,371 | 1/1982 | Appoldt et al. | 156/227 |
| 4,367,117 | 1/1983 | Seaborn | 156/443 |
| 4,473,153 | 9/1984 | Colangelo | 206/312 |
| 4,479,579 | 10/1984 | Miklos | 206/309 |
| 4,562,504 | 12/1985 | Miklos | 360/133 |
| 4,568,994 | 2/1986 | Lynch | 360/133 |
| 4,695,911 | 9/1987 | Loosen | 360/133 |
| 4,699,268 | 10/1987 | Oishi | 206/313 |
| 4,709,816 | 12/1987 | Matsumoto et al. | 206/444 |
| 4,724,501 | 2/1988 | Buchwald et al. | 360/133 |
| 4,811,152 | 3/1989 | Kishine et al. | 360/133 |
| 4,845,583 | 7/1989 | Zimmerman et al. | 360/133 |
| 4,863,032 | 9/1989 | Bothe et al. | 206/444 |
| 4,905,831 | 3/1990 | Bagdis et al. | 206/444 |
| 5,165,534 | 11/1992 | Kaufman et al. | 206/444 |

FOREIGN PATENT DOCUMENTS 2325715  12/1974  Germany.

*Primary Examiner*—John H. Wolff
*Attorney, Agent, or Firm*—Ostrager, Chong & Flaherty

[57] ABSTRACT

An improved micro computer diskette is constructed from a light-weight, foldable paperboard blank having nonwoven liner material bonded on its inner surfaces. The paperboard blank is scored with double or heavy caliber, single score lines to form a hinged portion between diskette jacket halves as a leading edge of the diskette and three side edges with overlay flaps for securing the jacket halves together. Folding the paperboard blank along the score lines and adhesively securing the overlay flaps produces a rigid cartridge structure for diskette use having liner material on its inner surfaces and external surfaces adapted for printing thereon with any desired graphics. The paperboard jacket halves are embossed in corresponding sections with offset ridges for lifting the liner material into cleaning contact with the disk media. Head slots are punched in the paperboard blank, and an externally removable tab with self-adhesive edges is used to cover the head slots. An alignment ring or button may also be formed by embossing into one paperboard jacket half.

11 Claims, 5 Drawing Sheets

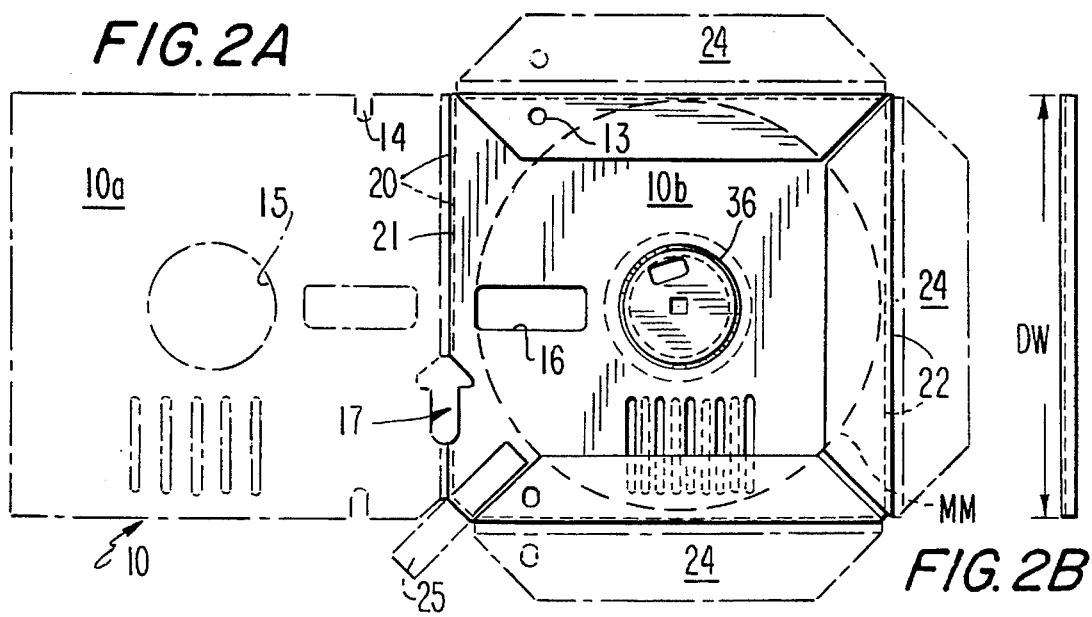
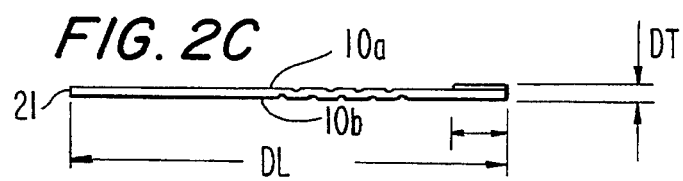
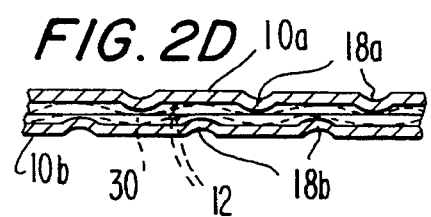
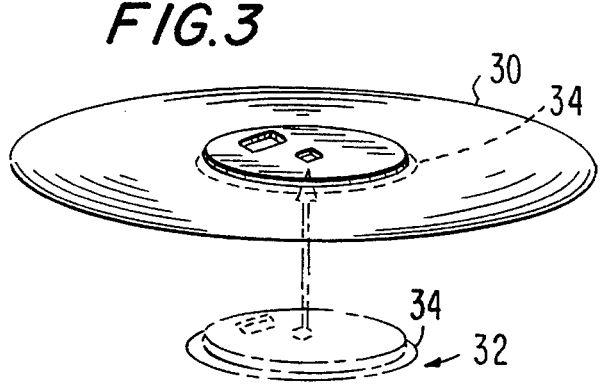

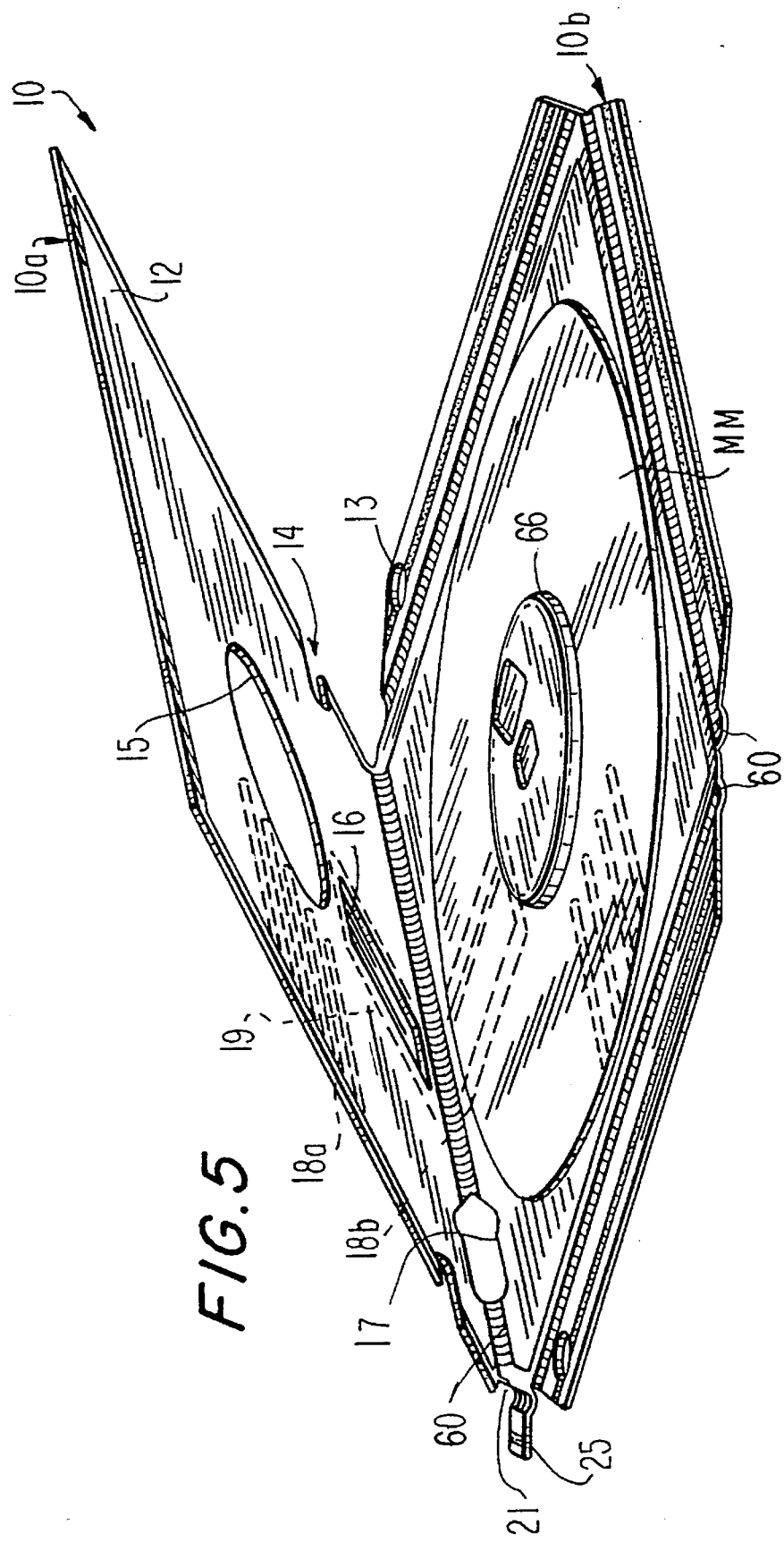

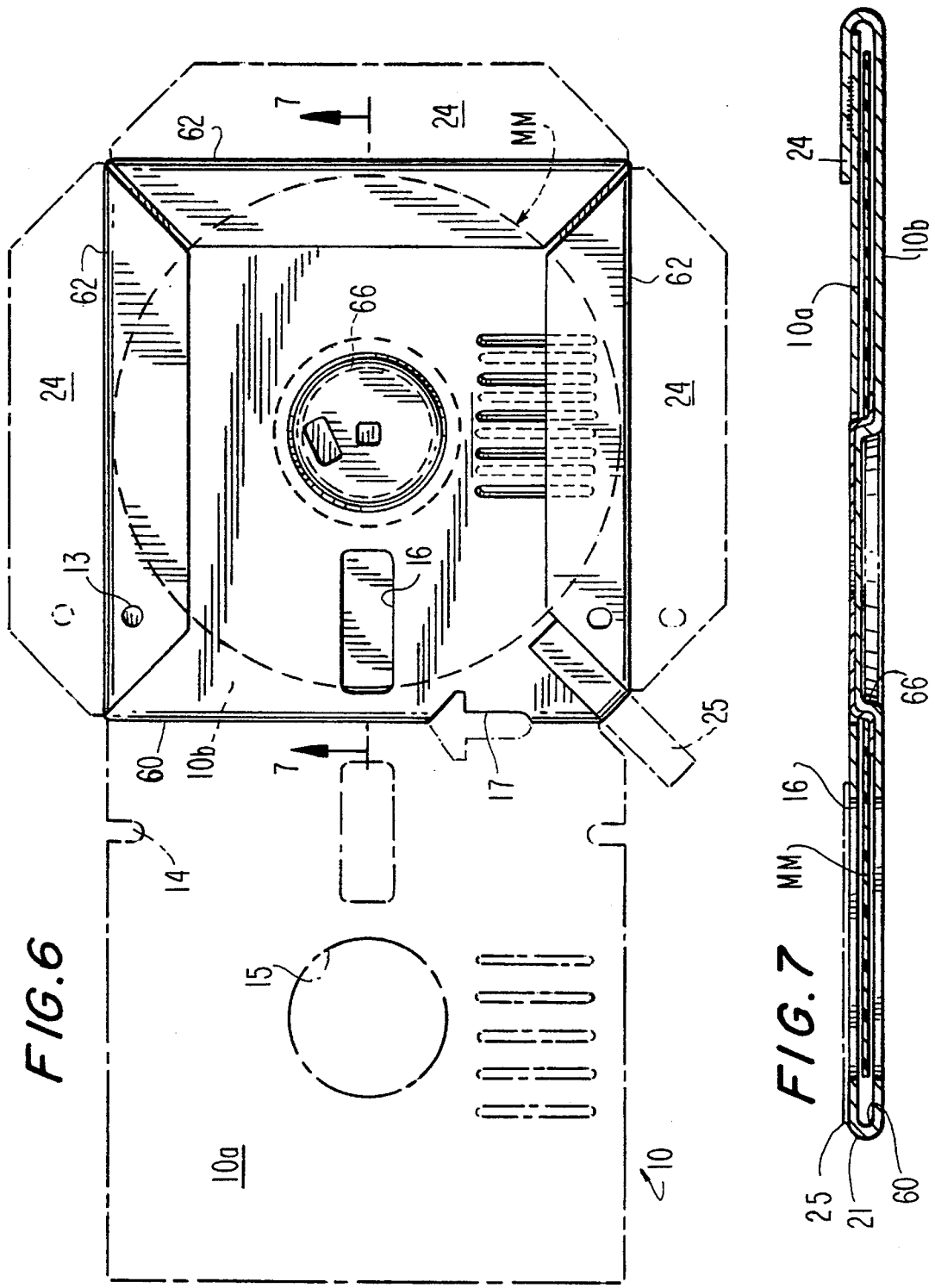

PAPERBOARD MICRO COMPUTER DISKETTE

SPECIFICATION

This application is a continuation-in-part of U.S. patent application Ser. No. 08/239,000 of the same title and inventor, filed on May 6, 1994.

TECHNICAL FIELD

This invention generally relates to technology for making a micro computer diskette, and more particularly, to making a micro diskette of a light-weight, foldable paperboard blank that is easy to assemble and can be printed directly with high resolution graphics.

BACKGROUND OF INVENTION

Existing micro diskettes of the 3.5 inch type are manufactured with rectangular external jacket halves made of hard plastic, an inner magnetic media disk, nonwoven liner, liner lifter spring, spring-loaded metal shutter, read/write lock, and other components assembled to the walls of the plastic jacket. These micro diskettes are relatively expensive to manufacture due to the materials used in their construction (injection molded plastic, stainless steel, spring elements) and the rather complicated series of steps required for complete assembly. The hard plastic jacket also makes it costly and difficult to print high resolution graphics on the diskettes for labelling or advertising purposes, thereby requiring a further step of printing adhesive labels and applying them to the diskettes. Diskette jackets made of paper or other printable materials have been used for forming an envelope-type structure for floppy diskettes of the 5.25 inch type, but cannot be used suitably for micro diskettes of the 3.5 inch type.

It is therefore the principal object of this invention to provide an improved micro computer diskette which is constructed of inexpensive materials, is easy to fabricate and assemble, and can be printed directly with high resolution graphics. A further object of the invention is to provide a technology for manufacturing an improved micro computer diskette using a light-weight, foldable paperboard blank.

SUMMARY OF INVENTION

An improved, low cost micro computer diskette is constructed from a light-weight, foldable paperboard blank having nonwoven liner material bonded on its inner surfaces. The paperboard blank is scored with score lines for folds forming a hinge between paperboard jacket halves and three side edges and overlay flaps for securing the jacket halves together. In one embodiment, double score lines are used at each fold to provide the requisite thickness for the diskette. Another embodiment uses large-caliber single score lines at the folds to provide the requisite diskette thickness while also improving manufacturability. Folding the paperboard blank along the center and side score lines and adhesively securing the overlay flaps produces a rigid, rectangular cartridge structure with the cleaning liner already positioned on its inner surfaces and with external surfaces that can be printed with desired graphics.

In the preferred embodiment, the paperboard jacket halves are embossed in corresponding sections with offset ridges for lifting the liner material into proper cleaning contact with the magnetic media. An alignment ring or button is affixed on the liner layer on the inside of one jacket half or embossed into the paperboard during diecutting of the blank. The magnetic media is adhered to a hub member which is seated on the alignment button in registration with a hub opening punched in the other jacket half. Head slots are punched in the paperboard blank to be in registration with each other when the diskette is assembled, and an externally removable tab with self-adhesive edges may be used to cover the head slots to replace the need for the conventional sliding, spring-loaded metal shutter.

Other objects, features, and advantages of the present invention will be explained in the following detailed description of the invention having reference to the appended drawings.

BRIEF DESCRIPTION OF DRAWINGS

FIGS. 2A, 2B, and 2C are plan and side views of the micro diskette of the invention, and FIG. 2D is a detailed side view showing embossed paperboard sections used to lift the liner material.

FIG. 3 shows a magnetic media disk assembled to a hub.

FIG. 5 is a perspective view (partially open) showing a further embodiment of an improved micro computer diskette using heavy-caliber single score lines to form the folds in the jacket.

FIG. 6 is a schematic plan view showing the paperboard blank and folds for the embodiment of FIG. 5.

FIG. 7 is a side sectional view of the diskette in FIG. 6 taken along view lines 7—7.

DETAIL DESCRIPTION OF INVENTION

Figure 1:
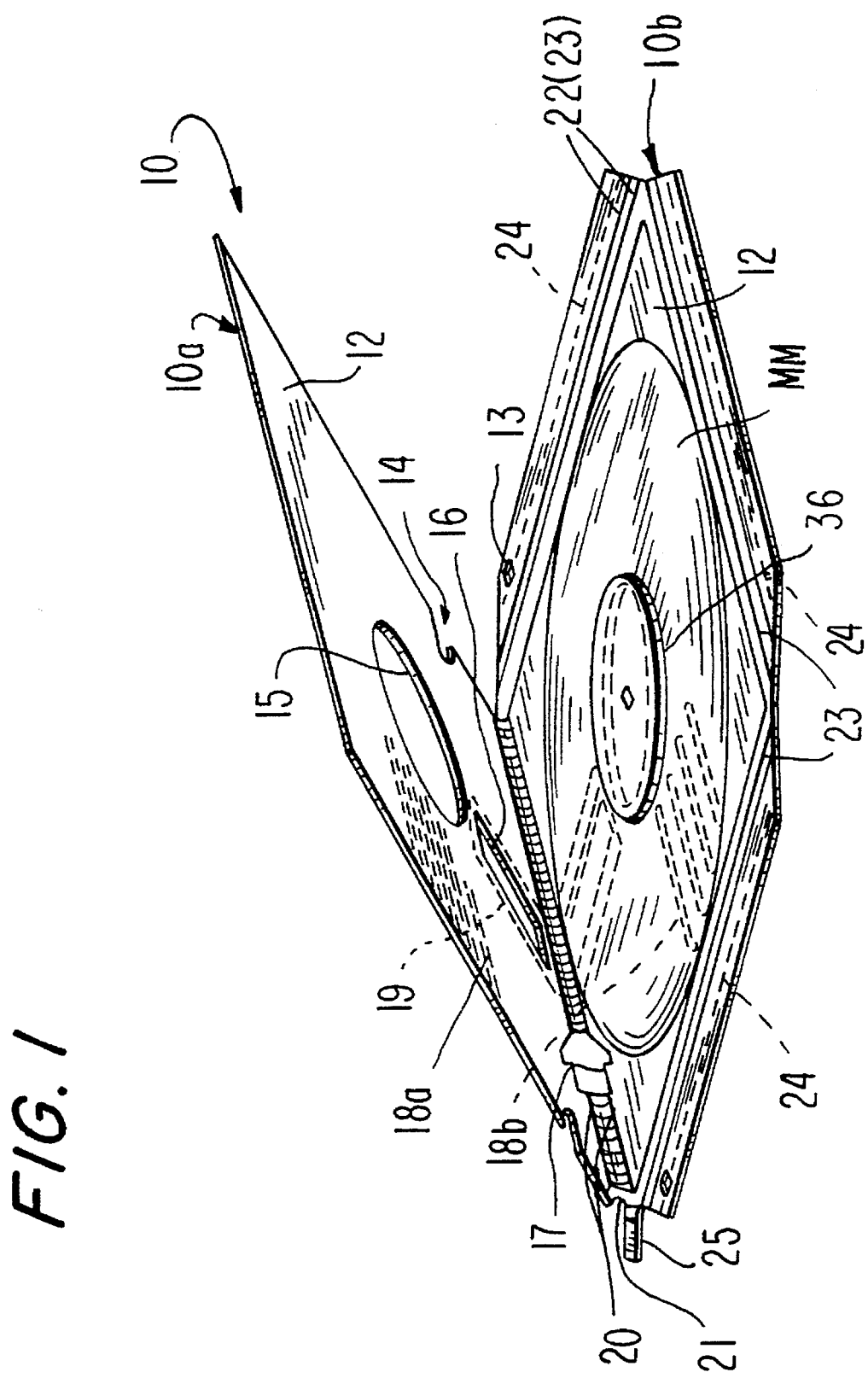
FIG. 1 is a schematic view in perspective showing a preferred embodiment of an improved micro computer diskette formed from a foldable paperboard blank in accordance with the present invention.

Referring to FIGS. 1 and 2A–2D, an improved micro computer diskette in accordance with the present invention is constructed from a foldable paperboard blank 10 having liner material 12 bonded on its inner surfaces. The paperboard blank is selected to be of relatively light weight yet strong enough to have the necessary rigidity for diskette use, for example, 7- to 24-gauge paperboard. A 10-gauge paperboard has been found to be most suitable for diskette applications. The blank 10 is preferably preprinted on its outer surfaces with desired graphics, but it may also have graphics printed thereon later. The liner 12 is typically a nonwoven fabric made of bonded or hydroentangled synthetic and/or natural fibers. The liner material is laminated to the paperboard blank in a prior fabrication of the blank stock laminate. For example, it can be secured through screen printing of adhesive patterns on the paperboard surfaces or bonded thermally.

The paperboard blank 10 is scored with center double score lines 20 to form a folding hinge portion between paperboard jacket halves 10a, 10b at a leading edge 21 of the diskette. Side double score lines 22 are also provided to form the three other side edges 23 and overlay flaps 24, 25 having adhesive applied thereon for securing the jacket halves 10a, 10b together. The score lines are spaced apart by an amount necessary to form the desired thickness of the micro diskette, which is conventionally about 0.130 inch. Since the leading edge 21 is formed by the hinged portion which is attached to the edges of the jacket halves, it has greater structural rigidity for engaging the operating parts of the disk drive. The flap 25 forms a short bevelled corner which is used to seat the diskette in a conventional micro diskette (3.5 inch type) disk drive. Folding the paperboard blank 10 along the double center and side score lines 20, 22 and adhesively securing the overlay flaps 24, 25 of the jacket half 10b to the jacket half 10a produces a rigid, rectangular cartridge structure of the required thickness DT with the liner 12 already positioned on its inner surfaces. The assembled diskette has a slightly longer length DL in the insertion direction of the leading edge 21 than its width DW in the transverse direction.

The paperboard blank 10 has fixture holes 13 and fixture notches 14 punched in the sides and side flaps to allow for the proper alignment of the diskette when it engages the drive. A hub opening 15 is formed in the jacket half 10a to allow engagement of a disk drive spindle with the hub drive holes. Rectangular head slots 16 are punched in corresponding positions in both jacket halves to expose the magnetic media at the position of upper and lower read/write heads of a micro diskette drive. Instead of using a conventional metal shutter which is costly and frequently jams, a removable cover tab 19 with self-adhesive edges may be used to cover the head slots 16 before and after disk use. A notched cutout 17 is formed at one side of the leading edge 21 of the diskette, by corresponding notch halves punched in the cardboard blank, and is used for positively locating the head slots for read/write operations in a disk drive.

As shown in FIG. 3, the magnetic media MM of the micro diskette is a magnetic disk 30 secured to a hub 32 by an adhesive layer 34 applied on a step portion of the hub. The hub 32 has spindle and drive holes that are used by the disk drive to rotate the disk media. In FIGS. 1 and 2A, an alignment ring or button 36 is bonded to the liner layer 12 at the center of the jacket half 10b. The magnetic media disk MM is seated on the alignment button 36 for rotation within the diskette structure when engaged in a disk drive.

In another aspect of the invention, the paperboard jacket halves 10a, 10b are embossed inwardly at corresponding sections with ridges 18a, 18b for lifting the liner material into proper cleaning contact with the magnetic media. As shown in detail in FIG. 2D, the ridges of each jacket half are offset from each other for lifting the liner material without pinching it between the ridges. The provision of the lifting ridges simply by embossing the paperboard blank eliminates the need for the conventional liner spring which is both costly and harder to assemble on the jacket halves.

Figure 4C:
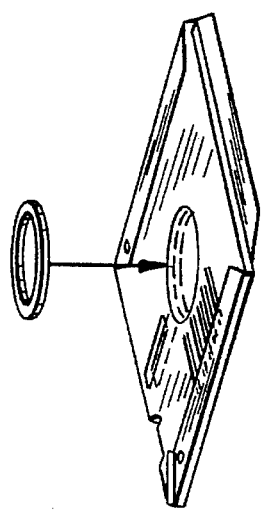
FIGS. 4A to 4F show the sequence of steps used to assemble the micro diskette from the foldable paperboard blank.
Figure 4F:
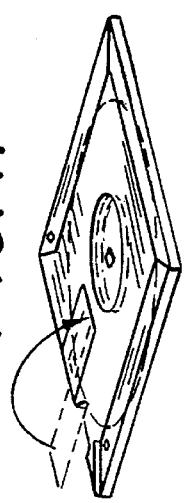
Figure 4B:
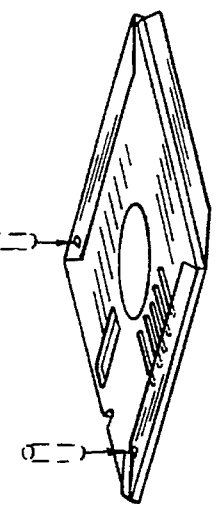
Figure 4E:
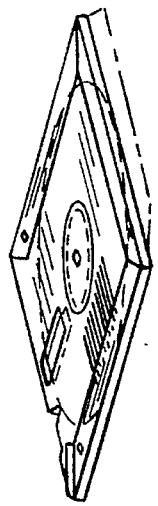
Figure 4A:
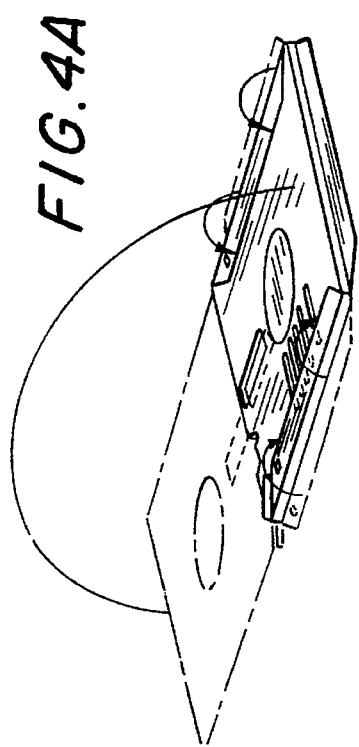
Figure 4D:
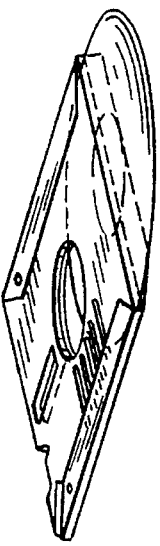

FIGS. 4A–4F show the sequence of steps used to assemble the micro diskette from the foldable paperboard blank. In the first step, the jacket half 10a is folded over and two side (and the corner) flaps are folded over and adhesively secured to form a three-sided pocket with one (trailing) end open. In FIG. 4B, the alignment of parts can be checked by optical sensors to verify that the registration of the fixture notches and holes are within tolerance limits. The centering button is adhesively secured to the liner on the lower jacket half through the hub opening through the upper jacket half in FIG. 4C. In FIG. 4D, the magnetic media disk is inserted through the open end of the diskette cartridge structure and seated on the centering button. In FIG. 4E, the final side flap is adhesively secured to the upper jacket half. The head slot tab is then applied to cover the head slots, as shown in FIG. 4F.

In FIGS. 5 and 6, a further embodiment of the improved micro computer diskette employs heavy-caliber single score lines 60 for forming the folds for folding the diskette. It is found that heavy-caliber single score lines for the required 3.5" micro diskette thickness can be formed by using a rule of about 4 to 6 points size (about 0.042 inch, standard industry measure) that are punched into the paperboard blank during the diecutting operation. The use of single score lines and single folds saves forming and assembly steps, thereby improving the manufacturability of the micro diskette.

As a further feature, an alignment button 66 can be readily formed in the paperboard blank by embossing a ring shape into the paperboard from the outer side of the jacket half 10b at the time of an up-setting operation. As shown more clearly in FIG. 7, the hub of the magnetic media disk MM is seated on the embossed alignment button 66 upon assembly of the diskette. Embossing the alignment button in the paperboard layer saves the cost of the conventional alignment ring or button, as well as labor for the assembly step that would otherwise be required. Alternatively, the conventional plastic-form alignment ring or button or other hub locating means can be adhered on the liner material on the inner surface of the jacket half as described previously. The other parts of the diskette in FIG. 5 are otherwise similar to those described in FIG. 1.

The improved micro diskette of the present invention greatly reduces the cost of manufacture and assembly through the use of a paperboard blank fabricated with liner material and the required diskette parts in one fabrication step. The paperboard blank folded at the score lines forms a rigid box-like structure. The use of scored, punched and embossed parts eliminates the need for costly assembly and extraneous material parts, such as the conventional injection molded plastic jacket halves, liner lifter spring, metal shutter, shutter spring and slide, and plastic-form alignment button. Additionally, the paperboard material lends itself to high resolution printing, in contrast to the current difficulty of printing on a hard plastic jacket. The resulting diskette has a low weight yet has the necessary structural rigidity for micro diskette use. A particularly suitable paperboard for manufacture of micro diskettes is a solid bleached sulfate paperboard which is clay coated on one side for printability, and has a 0.75 mil coating of polyethylene applied to the other side for liner bonding.

Various modifications and design variations may be devised given the above description of the invention. It is intended that all such modifications and variations be considered as within the spirit and scope of this invention, as it is defined in the following claims.

I claim:

1. An improved micro computer diskette including a magnetic media, the diskette comprising:

a foldable paperboard blank having nonwoven liner material on given inner surfaces thereof and external surfaces thereof adapted for printing thereon, wherein said paperboard blank is scored with a heavy-caliber single score line to form a hinged portion of a given thickness between two jacket halves of the paperboard blank at a leading edge thereof and similar heavy-caliber single score lines to form three side edges and overlay flaps on one jacket half, said overlay flaps of the one jacket half being secured to the other jacket half to form a rigid rectangular box-like structure with liner material on its inner surfaces for housing the magnetic media, and wherein said jacket halves of said paperboard blank are embossed with ridge portions for lifting the liner material into cleaning contact with the magnetic media.

2. An improved micro computer diskette according to claim 1, wherein the ridge portions embossed in each jacket half of said paperboard blank are formed in rows offset from those of the other jacket half.

3. An improved micro computer diskette according to claim 1, wherein an alignment ring or button is bonded to the liner material secured on one jacket half, and the magnetic media includes a disk adhered to a hub member which is seated on the alignment button in registration with a hub opening punched in the other jacket half.

4. An improved micro computer diskette according to claim 1, wherein an alignment ring or button is formed by embossing into the paperboard blank from an external side of one jacket half, and the magnetic media includes a disk adhered to a hub member which is seated on the alignment button in registration with a hub opening punched in the other jacket half.

5. An improved micro computer diskette according to claim 1, wherein head slots are punched in the jacket halves of the paperboard blank so as to be in registration with each other when the jacket halves are folded to form the diskette.

6. An improved micro computer diskette according to claim 5, further including an externally removable tab with self-adhesive edges used to cover the head slots in the diskette jacket halves.

7. An improved micro computer diskette according to claim 1, wherein said paperboard blank is formed with a flap and corner score line to form a bevelled corner of the diskette for locating the diskette in position in a disk drive.

8. An improved micro computer diskette according to claim 1, wherein said paperboard blank is made of 7- to 24-gauge paperboard.

9. An improved micro computer diskette according to claim 1, wherein said paperboard blank is made of 10-gauge paperboard for forming a micro diskette of the 3.5 inch type.

10. An improved micro computer diskette according to claim 1, wherein said heavy-caliber single score line has a dimension in the range of about 4 to 6 point size.

11. A method of forming an improved micro computer diskette including a magnetic media, comprising the steps of:

forming a foldable paperboard blank having nonwoven liner material on given inner surfaces thereof and external surfaces thereof adapted for printing thereon, scoring said paperboard blank with a heavy-caliber single score line to form a hinged portion of a given thickness between two jacket halves of the paperboard blank at a leading edge thereof and similar heavy-caliber single score lines to form three side edges and overlay flaps on one jacket half, said overlay flaps of the one jacket half being secured to the other jacket half to form a rigid rectangular box-like structure with liner material on its inner surfaces for housing the magnetic media, and embossing ridge portions in the jacket halves of the paperboard blank for lifting the liner material into cleaning contact with the magnetic media.

* * * * *